US008862506B2

(12) United States Patent
Smith et al.

(10) Patent No.: US 8,862,506 B2
(45) Date of Patent: Oct. 14, 2014

(54) USER CONTROLLED SYSTEM AND METHOD FOR COLLECTING, PRICING, AND TRADING DATA

(71) Applicants: Stanley Benjamin Smith, Charlotte, NC (US); Joseph Sherman Tate, Durham, NC (US)

(72) Inventors: Stanley Benjamin Smith, Charlotte, NC (US); Joseph Sherman Tate, Durham, NC (US)

(73) Assignee: Stanley Benjamin Smith, Charlotte, NC (US)

( * ) Notice: Subject to any disclaimer, the term of this patent is extended or adjusted under 35 U.S.C. 154(b) by 0 days.

(21) Appl. No.: 14/048,012

(22) Filed: Oct. 7, 2013

(65) Prior Publication Data

US 2014/0032267 A1    Jan. 30, 2014

Related U.S. Application Data

(63) Continuation-in-part of application No. 12/930,280, filed on Jan. 3, 2011, now Pat. No. 8,510,176.

(51) Int. Cl.
*G06Q 30/00* (2012.01)

(52) U.S. Cl.
USPC .................. 705/26.5; 705/27.1; 705/26.1

(58) Field of Classification Search
USPC .................................. 705/26, 27
See application file for complete search history.

(56) References Cited

U.S. PATENT DOCUMENTS

| 6,490,601 | B1* | 12/2002 | Markus et al. | 715/207 |
| 6,925,607 | B2* | 8/2005 | Szlam et al. | 715/762 |
| 7,574,376 | B1* | 8/2009 | Berman et al. | 705/26.41 |
| 7,630,986 | B1* | 12/2009 | Herz et al. | 1/1 |
| 7,725,811 | B1* | 5/2010 | Bedell et al. | 715/200 |
| 7,953,696 | B2* | 5/2011 | Davis et al. | 707/608 |
| 2006/0015435 | A1* | 1/2006 | Nathanson | 705/37 |
| 2006/0167907 | A1* | 7/2006 | Jones | 707/100 |
| 2006/0206412 | A1* | 9/2006 | Van Luchene et al. | 705/37 |
| 2007/0130132 | A1* | 6/2007 | Wu et al. | 707/4 |
| 2008/0015962 | A1* | 1/2008 | Smith | 705/35 |
| 2009/0254971 | A1* | 10/2009 | Herz et al. | 726/1 |
| 2010/0010968 | A1* | 1/2010 | Redlich et al. | 707/3 |
| 2010/0153278 | A1* | 6/2010 | Farsedakis | 705/80 |

OTHER PUBLICATIONS

Hyperion: "Hyperion Unveils New Business Intelligence Platform," PR Newswire, Feb. 24, 2004; Dialog file 613 #01117326, 5pgs.*
Brio: "Brio Pushes Information Onto the Desk of Those Who Need It," Computergram International, Nov. 5, 1997; Dialog file 16 #0532473, 2 pgs.*
Business Objects: "Business Objects Delivers Performance Management Applications on Trusted BusinessObjects XI Platform," Business Wire, May 8, 2005; Dialog file 610 #0001279450, 3pgs.*
Tanner, Adam: "Others Take Your Data for Free, This Site Pays Cash," Forbes, www.forbes.com, Mar. 3, 2014, 3pgs.*
Business Wire: "Jigsaw Sets Data Free: Launches Open Data Initiative with the Support of Top CRM and Contact Management Providers Including NetSuite, Oracle, Sage . . . " Jun. 4, 2008; Dialog file 610 #0001949771,3pgs.*
Business Wire 2: "SugarCRM Announces Support of Jigsaw's Open Data Initiative," Jun. 4, 2008; Dialog file 610 #0001949728, 3pgs.*
Jigsaw Website: Internet Archive Wayback Machine (www.archive.org/jigsaw.com); Jul. 27, 2008; 2pgs.*

* cited by examiner

*Primary Examiner* — Rob Pond

(57) ABSTRACT

A method for user directed collection and pricing data for trading or sale. The method enables the user to capture field labels and entries for assignment to one or a plurality of domain categories and processing classes. The user retains control over the data as it is captured, categorized, priced, and packaged for sale to participants in a data supply chain.

16 Claims, 4 Drawing Sheets

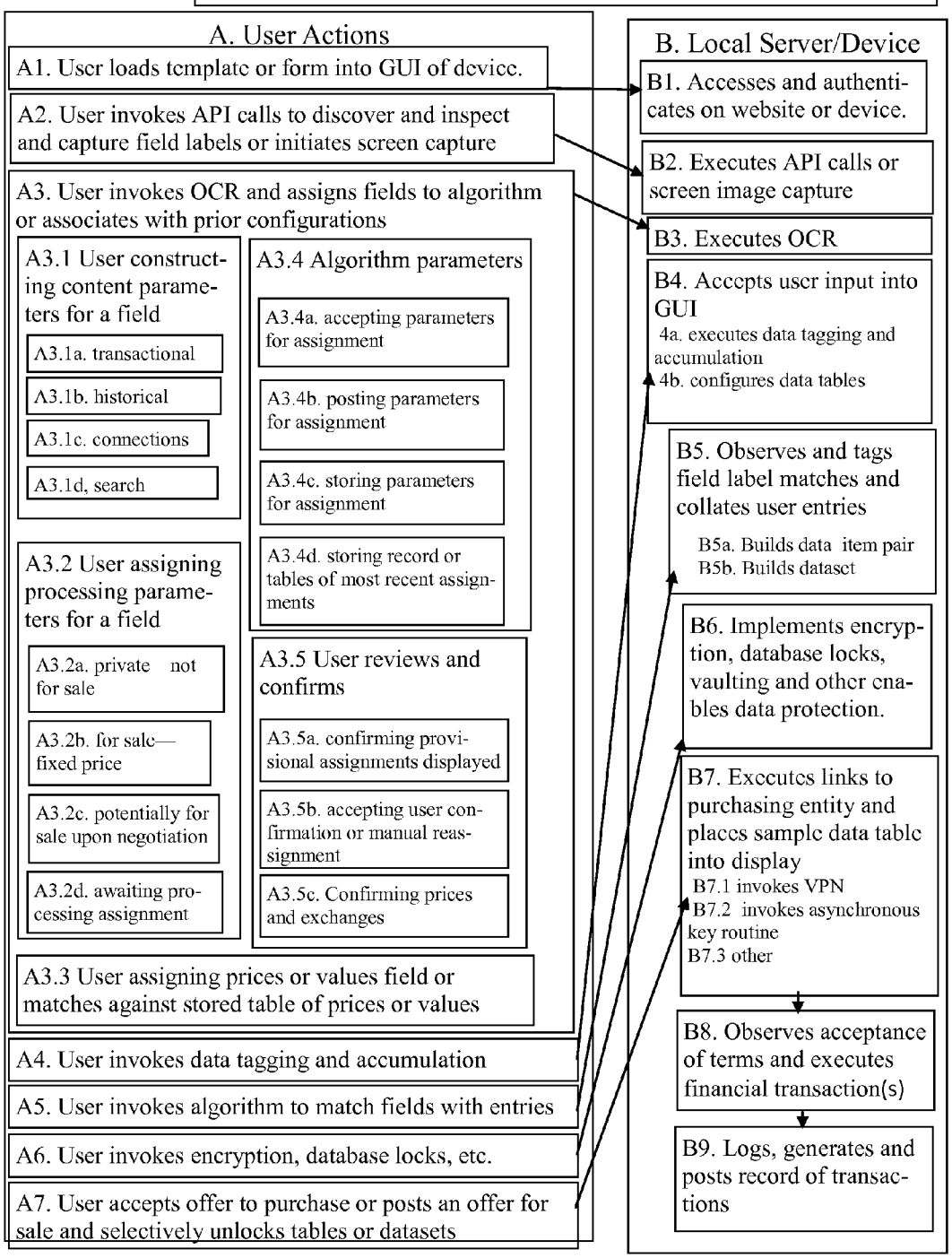
Figure 2. Field assignment and algorithm operation

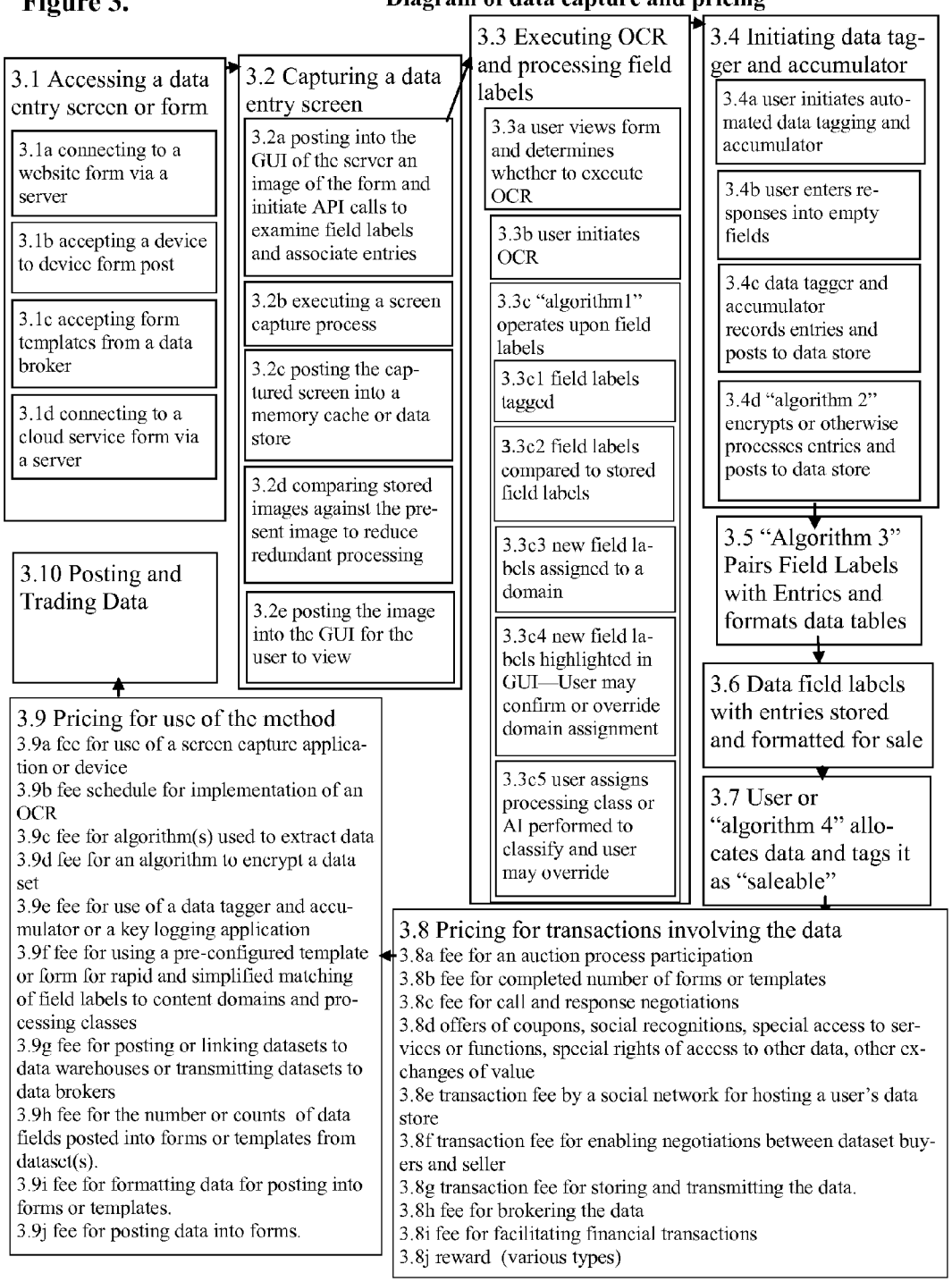
Figure 3. Diagram of data capture and pricing

Figure 4. Diagram of input, protection, and processing steps
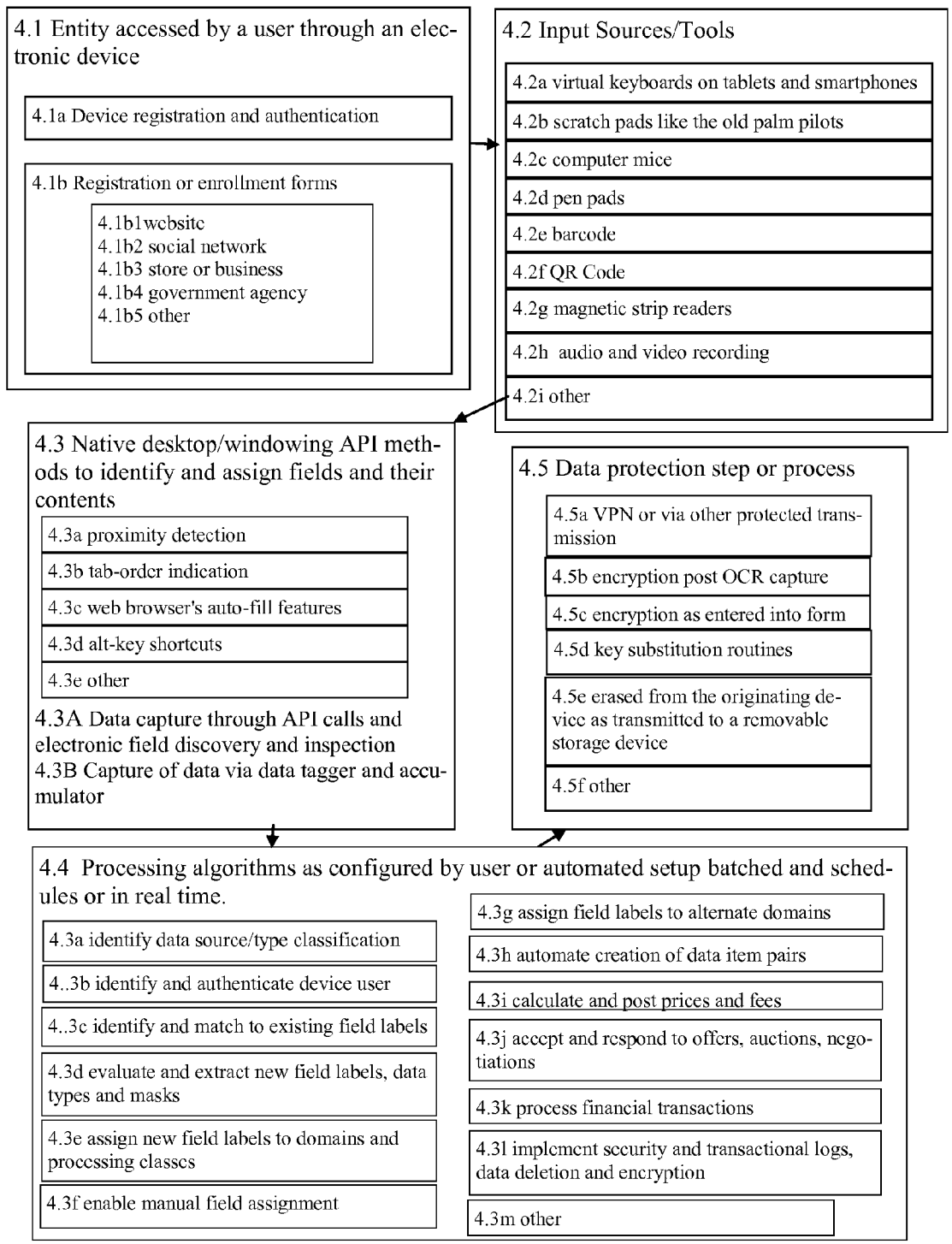

USER CONTROLLED SYSTEM AND METHOD FOR COLLECTING, PRICING, AND TRADING DATA

This application is a continuation in part of Ser. No. 13/135,420 and claims priority and benefit of U.S. application Ser. No. 13/135,420 filed Jul. 5, 2011 U.S. Pat. No. 8,612,307 entitled "A system and method to price and exchange data between data producers and data consumers through formatting data objects with necessary and sufficient item definition information" which is hereby incorporated by reference in its entirety, which is a continuation-in-part of U.S. application Ser. No. 12/930,280 filed Jan. 3, 2011 U.S. Pat. No. 8,510,176 entitled "Method and system using search terms to accumulate, aggregate and price data from a plurality of data originators.

BACKGROUND OF THE INVENTION

1. Field of the Invention

The advent of the internet muddied ownership of data. Assumption of the right to coopt or steal data by entities that process packets of data while it is being transmitted expanded into active placement of malware, spidering software, key loggers, Trojans, and other methods and tools to hijack data or copy data from a server or while it is being transmitted across servers. As the internet has expanded, the number of entities accessing formerly protected and privately held data has increased to the point that theft and misuse of data poses a risk to the financial system, to homeland security, to copyright and intellectual property rights, and to personal privacy.

With the advent of websites, social networks, and mobile device applications requiring users to voluntarily open gateways into their servers and devices, the ability of data thieves to penetrate and lift data from internet linked servers or networked electronic devices has expanded to such an extent that many data producers and individual users of electronic devices have begun to assume that control over their data and the retention of their rights as owners of their data is futile.

The US Congress and the US courts have not yet determined how to enforce property and privacy rights over data. The European Union is also struggling to clarify ownership and privacy issues. Indeed the issue of data theft and assertion of data ownership rights is worldwide and endemic. A few attempts have been made to address the problem, though a percentage of these are also disguised data co-optation schemes. For example, many "privacy" policies that must be endorsed before enabling users to join social networks or register on websites require users to effectively transfer ownership of data produced by or upon their own devices to the social network or website. Transactional data, if posted onto the social network or website, is often aggregated with other data and resold. Demographic data and email transactions are even more difficult to protect because theft of demographic data is so ubiquitous that identifying which entity is stealing and marketing data is increasingly difficult. Rather than a direct sale in an open market, data is often trafficked by middlemen who have aggregated it through direct theft via spyware or other means, or bought it from websites or social networks who have co-opted it and serve as middlemen or "data fences". Even IP that would normally be subject to copyright or a continuous chain of authorship and ownership, when it is posted upon or collected by or through a website or social network, increases the difficulty of asserting ownership.

A market for personal data and other data entered into response or data collection forms exists because commercial enterprises can re-purpose and leverage the data to enable more targeted and effective advertising, more targeted and effective product development and design, and other uses aimed at increasing their market share or easing their research burdens. It has been in the interest of entities with business models built upon extraction of value from data to continue to co-opt data. Additionally, federal and local agencies involved in homeland security have an understandable interest in access to data generated by devices owned by citizens or generated through the intellectual activities of citizens if these threaten the nation or are in violation of existing laws. Current data ownership ambiguity invites abuses by these agencies. Access by law enforcement to private data must be subject to a subpoena through a judicial system that enforces constitutional protections. Further, the interests of corporations and federal, state, and local entities must be balanced against constitutional protection of both privacy and intellectual property. As will become evident in the description of the art that follows; the invention disclosed herein will enable an entity obtaining a subpoena for data to specify the scope and constraints for the data in accordance with field labels and the entries associated with them, thus serving both the Constitution and the need for homeland security.

2. Description of the Related Art

Since technology has outpaced the ability of regulatory entities to keep ahead of the curve regarding data privacy and data ownership, additional technology must be developed to enable lawmakers and regulators to have a record and a trail of data movement to be able to attribute ownership and enforce property rights. The invention disclosed herein is one approach to empowering an individual data creator to consciously indicate which of their data they want to retain as private, which of their data they want to package for sale in a data marketplace, or which of their data they want to voluntarily contribute or exchange with another entity participating in a data supply chain. It teaches an effective system and method for designating and attributing ownership of data, organizing that data, and structuring the sale and exchange of that data. It builds upon the prior art that follows and is intended to be used in tandem with other data supply chain systems and processes and to further develop the systems and methods taught in the following pending patent applications and allowed and issued patents; Ser. Nos. 13/845,015, 13/781,035, 13/749,253, 13/567,084, 13/545,891, U.S. Pat. No. 8,271,346, Ser. Nos. 13/200,073, 13/136,421, 13/135,420, 13/134,596, 12/932,798, U.S. Pat. Nos. 8,510,176, 7,860,760.

As data producers have become aware of limitations to the privacy of their data and theft of data, inventors of prior art have taken three primary approaches to meliorating the problem. The first approach is encryption of data to prevent thieves from accessing or using it without additional processing. Many algorithms and methods for performing encryption and for packaging and transmitting encrypted data have evolved and there is sophisticated art for doing so. The second approach is restricting access to hard drives or other storage media through password protection and an evolving art for biometric recognition of the correct owner of a device housing a data store through mediating processes like voice recognition, fingerprints, hand gestural patterns, retinal patterns, and so forth. Many alternatives to a traditional password are evolving. The third approach is the embedding or insertion of additional content to the data store such as a poison pill to discourage a thief or to add a watermark or traceable image or code that identifies the originator of the data.

SUMMARY OF THE INVENTION

The art introduced by the invention under consideration herein can be readily folded into or joined to the systems and methods reflected in the prior art for data protection and privacy and introduces a fourth approach. Further, this fourth approach both provides a barrier to those who would steal data and induces those who would want the data to buy it in an open market. Entities that lift encrypted data or that bypass protection of data stores upon devices tend to download massive sets of disordered and unstructured data that they then "mine" and allocate and structure for their own use. Art for data analysis and for data mining coupled with search or query capability is commonly required for the data to be of any use to the data thief. The risk of being discovered as a thief combined with the need for additional operations upon the data is an "expense" associated with stolen or fenced data. The invention disclosed herein eliminates that expense and enables and potentially entices a data consumer or user to engage in legitimate data purchasing and exchange, especially if the data is fairly priced and partially or fully shaped and structured for use. The invention is one step to further evolve an open and transparent data trading market.

It is anticipated that the system and method disclosed herein will reduce the incentive to steal data. Art for protection of devices, for encryption of data, and for "poison pills" or watermarks within data will continue to be additional barriers to theft and will be used by data producers according to their own judgment of the risks of theft of their intellectual property by unscrupulous actors.

The simplest way to describe the invention is that field labels and entries made in response to field labels are captured as or before they are submitted to a third party and then bundled, priced, and potentially sold to a second party.

BRIEF DESCRIPTION OF THE DRAWINGS

Other aspects, features, and advantages of the present invention will become more fully apparent from the following detailed description, the appended claims, and the accompanying drawings in which:

FIG. 2 "Field assignment and algorithm operation" shows a diagram representing exemplary processing of algorithms and field assignment for an exemplary embodiment of the invention.

FIG. 3 "Diagram of data capture and pricing" shows a diagram representing processing for data capture and pricing for an exemplary embodiment of the invention.

FIG. 4 "Diagram of input, protection, and processing" is a diagram illustrating various operational aspects of various components for an exemplary embodiment of the invention.

DESCRIPTION OF THE INVENTION

Figure 1:
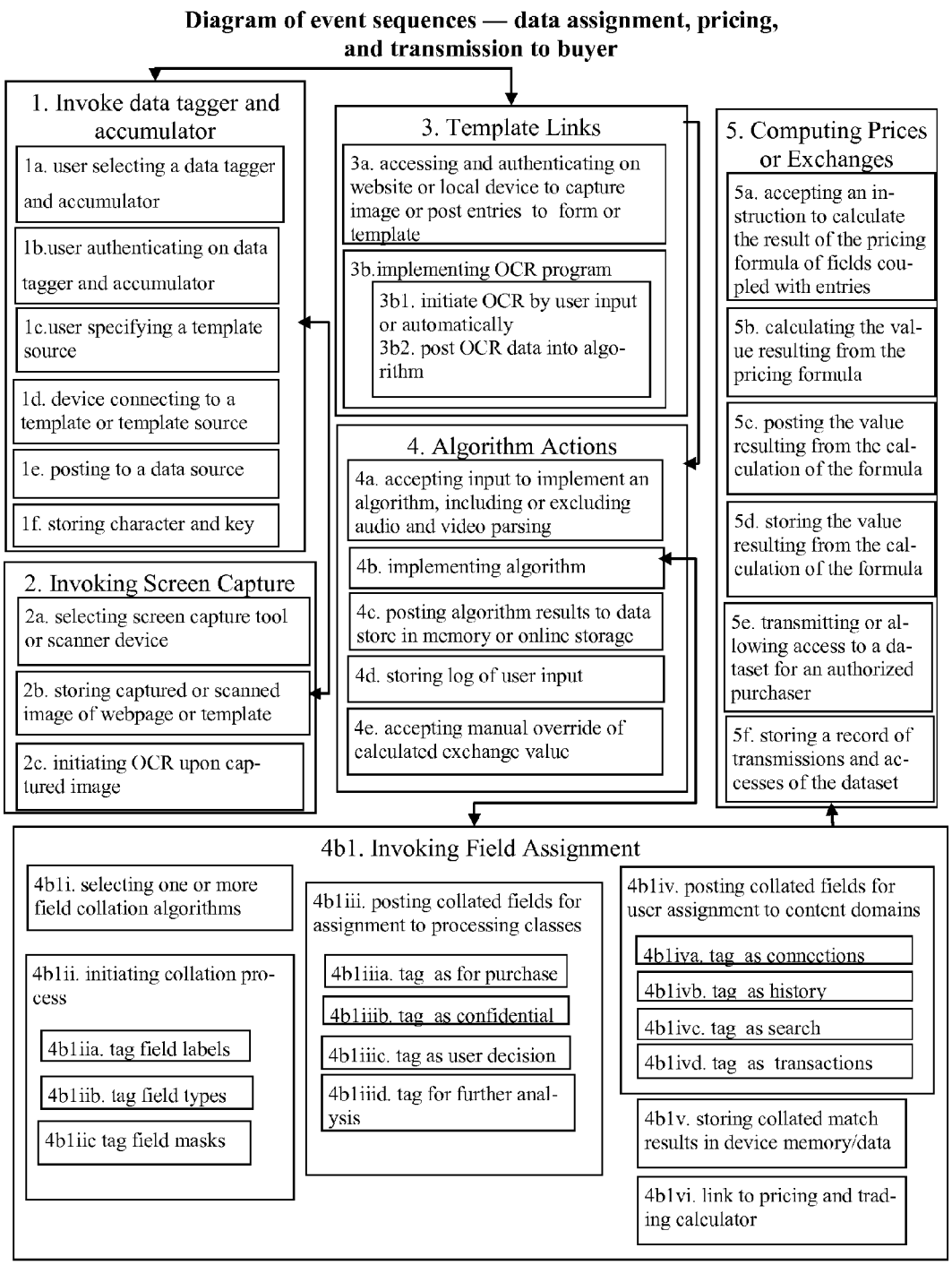
FIG. 1 "Diagram of event sequences—data assignment, pricing, and transmission to buyer" is a diagram illustrating various components in accordance with an exemplary embodiment of the present invention.

This invention leverages the invention of which it is a continuation in part; U.S. application Ser. No. 13/135,420 and claims priority and benefit of U.S. application Ser. No. 13/135,420 filed Jul. 5, 2011 entitled "A system and method to price and exchange data between data producers and data consumers through formatting data objects with necessary and sufficient item definition information" Ser. No. 13/135,420 itself is a continuation in part of Ser. No. 12/932,797, in which a user interacts in a structured manner with a graphical user interface and these interactions are recorded, stored, priced, and included into trigger formulae to initiate API's or other forward or backward chains of server actions. In this continuation of Ser. No. 13/135,420, the invention described herein enables the user to interact with a keyboard or other virtual or physical character input or generation device associated with the user's electronic device in a structured manner to store, log, assign, index, and organize data. A user of the invention inputs alphanumeric characters into templates and forms on a local device, a remote device, or into web or cloud service. Other character input devices in embodiments of the invention may include virtual keyboards on tablets and smartphones, or scratch pads (like the old palm pilots). Computer Mice, pen pads, Barcode, QR Code, and magnetic strip readers may also serve as character input devices for some types of data and associated processes for automated form collection or data posting. Audio and video inputs into data stores on devices, upon conversion into alphanumeric characters and upon classification to match against field labels, is also considered as a form of character input for the invention described herein. Phone conversations, video text messaging, and other multi-media transmission responsive to structured input fields (field labels) or questions, even if they do not directly involve web forms may be converted and processed through the data store, provided that there are algorithms that can convert the audio or video or multi-media files into alphanumeric characters for processing by the method of the invention. In this case an algorithm will parse audio and video streams generated from a device accessible to a user to extract alphanumeric characters from the data stream and match these against field labels and entries already in a data store. If partial matches are discovered, the algorithm will enable posting of the partially matched field labels and entries into a GUI for a user to adjust wording or language or match to other field labels and post these to the data store along with assignment to the same content domain and processing class. If the field labels are unmatched, these will be posted into the GUI for manual assignment by the user of the device generating the audio or video data stream.

Art taught in the invention described herein is directed to matching field labels within forms or input templates with entries made into said forms and input or data collection templates in order to reduce redundant field labels and to structure and collate matched field labels with entries into attributable, saleable, and "consumer friendly" datasets. The invention anticipates that properly structured datasets will increase in value in rough proportion to their utility and relevance to a data purchaser and provides methods for indexing, collating, structuring and attributing data to enable the user of the invention or algorithms that implement computer readable code upon electronic devices configured to implement computer readable code of the invention to maximize the potential value or price of the data generated by an individual data producing entity within an open market. Multiple variations of forms for collecting personal data or responses to questionnaires for research or assessment are distributed over the internet. Much of the data is captured redundantly and there is an advantage to a user of the invention described herein to reduce the need for redundant data entry by capturing field labels (questions) posed to users of the invention along with entries (answers) these users post in response to the questions. Methods to facilitate automated form completion are a key advantage of the invention.

One method taught to capture entries to match with field labels in some embodiments will utilize native desktop/windowing API methods to identify fields and their contents to the extent it is possible through the use of an electronically enabled platform. This mechanism will use proximity detection, or tab-order indication to assign field labels that match entries or "field elements." For example, on the Windows platform, labels immediately precede the fields they describe to enable a user to set up alt-key shortcuts to jump to specific fields. This method will enable an accurate pairing, and will work in tandem with a web browser's auto-fill features. The simplest embodiment of the invention enables data capture as a user operates the invention through use of a browser extension to examine form fields on a web page as responses or entries into the form fields are entered. Image capture, OCR and key logging as discussed and included in some embodiments of the invention may either be bypassed or used as a confirmation for data returned if a browser extension and API calls are implemented upon a data capture form posted over the Internet.

More complex embodiments capture the data through key logging. In these embodiments, assignment of entries to field labels is achieved less directly through enabling a data entry form to be scanned for further processing by an OCR application or through capturing a screen image of a data entry form or template followed by invoking an OCR application to capture field labels within the form; and running an algorithm to match field labels against field labels already in the data store; or appending unmatched field labels to the data store; thus enriching and evolving a dataset of field labels for further collation and matching with forms posted by other data collectors. Entries into the data form are captured through a data tagger and accumulator or other character capture apparatus or tool and these entries are paired with and assigned to previously captured field labels. The field labels are also logged and arranged and ordered. Algorithms associated with the invention do real time assignment of data entries to a field label. Algorithms associated with the invention also act upon data entries that have been stored or cached to assign to, pair with, or couple data entries in batches with the correct field labels. The "coupled" data may in some embodiments be formatted into a series of data item pairs as in art taught by Smith (Ser. No. 13/135,420). Algorithms to assign a field label to alternate indexes or domains will be included in some embodiments of the invention. Additional embodiments include alternate data formats to couple a field label with an associated entry so these data can be further processed for trade or sale or encryption or password protection or deposit into protected servers or cloud service "vaults." Algorithms that convert video and audio data into alphanumeric characters and then scan for matches with field labels to evolve indexing and assignment to field labels and content domains and processing classes are also included in embodiments of the invention.

If data processed by this system and method has a market or exchange value sufficient to merit trades or exchanges with entities that might wish to reuse or leverage the data, the data can be designated for trading to prospective buyers. Data buyers may include middlemen who would wish to aggregate or package the data and operate as data brokers. In some embodiments the data traded may be through a VPN or via other protected transmission vehicles and methods. In some embodiments the data may undergo encryption prior to transmission. In some embodiments the data may be ported onto removable drives or devices that can be readily separated from the originating device. In some embodiments the data may be encrypted as it is entered onto a device by one or a plurality of key substitution routines via the keyboard of the user's device. In some embodiments the data may erased from the originating device as it is transmitted to a storage device. Combinations of encryption and erasure and private or secured transmission and posting to separate devices can be implemented by users of the invention via various embodiments. Embodiments of the invention may integrate or combine with "data supply chain" processes of one or a plurality of the inventions by Smith, currently in the examination and application process or allowed or issued by the USPTO; Ser. Nos. 13/845,015, 13/781,035, 13/749,253, 13/567,084, 13/545,891, U.S. Pat. No. 8,271,346, Ser. Nos. 13/200,073, 13/136,421, 13/135,420, 13/134,596, 12/932,798, U.S. Pat. Nos. 8,510,176, 7,860,760. Technology and methods for implementing scanning of forms or screen capture are readily available—as is key logging—and the user of the invention will invoke one or a plurality of data taggers and accumulators in tandem with, prior to, or following the user loading one or more data collection forms or templates or documents onto a device configured to process computer readable code. Alternately a user may link to a form or template or document on a remote server or website and use one or a plurality of screen captures to provide an OCR reader with one or a plurality of images to process that then are paired or coupled with one or more sets of field labels. In some embodiments, these field labels will be coupled with entries by a data assignment and allocation algorithm. A form template or document may alternatively be pulled from data collection templates provided by potential data brokers or other data buyers, by a website, or by a research entity. It is expected that the user of the invention will use it on a local server or a local device, though there may be embodiments that include remote or mobile access and operation upon forms delivered through cloud services.

Any electronic device may be configured to provide a template or form for user registration and/or a variant of a data gathering format, thus enabling an individual to enter data that may have value for resale. An example of such a template is the set of input fields required to initiate a home security system and structure the sequences for turning on or off lights and other electronic appliances and devices in the "smart home." Thus, data being transmitted via the "internet of things" or pervasive or ubiquitous computing can be folded into the process for coupling field labels with data entries. Some embodiments will be centered upon practical implementation of methods and systems for device management where the devices host templates or present users of the devices with forms or templates to collect input from the device user through GUIs (Graphical User Interfaces) or other variants of user interfaces. Other embodiments will be centered upon registration and enrollment into various services or programs where the service providers or programs present a user of an electronic device configured to process computer readable code with registration or enrollment forms. Yet other embodiments will be associated with social network participation and transactions and postings into the social network if the social network offers forms or templates requiring user input in order to authenticate themselves or engage in transactions enabled by the social network.

Aspects of the data capture process taught by the invention are sometimes used or implemented by spyware systems. However, art used for spyware does not pair field labels and entries in a rationalized or rigorous manner, and does not assign field labels or entries to "parent domains" or "processing classes" as described below. The invention described herein undercuts spyware by giving the user ultimate control over his or her data, and it is not collected or structured or transmitted without the explicit consent and knowledge of the user.

An embodiment of the invention to achieve data capture includes a browser extension that intercepts data inserted into a form using javascript code or other computer readable code to read the field values in the form and operate as a "data tagger and accumulator" to post all the field values into a data store accessible to the device of the user before returning control back to the web page to accept data submitted to the server normally. The data tagger and accumulator then implements computer readable code to examine the field label, also often called the "field name" posted into the data store and evolves a "thesaurus" of alternate names for field labels. As this embodiment is implemented, a rich history of user classifications of field labels evolves. A variant of this embodiment for windows MFC or Windows Forms or other operating systems and applications, implements a shortcut key to launch the data tagger and accumulator. It searches the focused window within the GUI of the user for all fields, then using the "handles" or labels for those fields, grabs retains posts and otherwise processes the current value(s) to evolve the thesaurus. A second variant of the data tagger and accumulator uses an algorithm to extract and compare candidate terms for field labels from audio or video data streams.

Embodiments also include posting a form or template or document into the display screen or graphical user interface of a remote server or electronic device associated with the user of the invention described herein—indeed for any electronic device accessible to the user. An image of the form or document upon the display screen is captured and processed by a scanner or other screen capture technology for an OCR reader to capture field labels, types, and masks within the form or document. The captured screens may be posted into data storage services or repositories, such as Dropbox, to be drawn down by a user at a later date. Technology and methods for optical character recognition is already available and the user of the invention will be enabled to invoke one a plurality of OCR systems or readers. Embodiments include integration of algorithms to expand or enhance the capabilities of OCR systems to further classify the alphanumeric characters in forms or templates and assign and collate these characters with field labels, types and masks as these entries are allocated to or posted to a data store. The term "algorithm," for purposes of the invention described herein, means computer readable code that can run on systems or devices configured to implement computer readable code and perform calculations or other operations upon data that is classed as a field label and/or data that is classed as an entry responsive to a field label. Algorithms may further initiate API's or computer or device applications to enable financial transactions, security and authentication operations, encryption, linkages across electronic devices, and other functions and operations. An algorithm is also included in the invention to parse audio and video streams generated by a user through the device of the user to match alphanumeric characters extracted from the audio and video stream against already assigned field labels and entries in the data store. When the algorithm determines an exact match, posting an entry matched to the field label into the data store is automatic, but when the match is partial; the partial match is posted into the GUI of the device for the user to manually configure and accept or reject. If the match of a field label is accepted, the user can append it or assign it to the field label or indicate it is a new field label and append it to the field labels in the data store.

Persons skilled in the art of automated computing will be able to develop computer readable code to combine with the system and method of the invention disclosed herein to enhance existing business processes involving data capture, formatting, configuration, posting, classification, computation upon or within datasets, storage, transmission, and other processing. An embodiment of the invention may be implemented through a computer chip that is designed to manage hardware to operate as a data tagger and accumulator and/or implement a combination of optical character recognition, key logging, and also for connection of local devices in the possession of a user of the invention (such as mobile phones or tablets) to kiosks or electronically enabled terminals that are configured to post forms and accept entries. Many combinations of hardware and computer readable code to run on devices configured to implement computer readable code can be enabled in a given variant of an embodiment of the invention.

The invention and its embodiments will enhance extant algorithms or provide additional algorithms to further enable assignment of field labels, types, and masks to one or a plurality of sets of one or a plurality of domains associated with the user. With auto-form completion or entry provided by modern browsers; field recognition for some embodiments may include an additional processing cycle to use OCR capabilities to re-identify the automatically inputted data and field labels or initiate the data tagger and accumulator to operate upon inputted data and field labels. If field labels, types, and masks are not able to be assigned to a content domain through an algorithm(s) or enhancements to an algorithm(s), computer readable code is initiated upon an electronic device to post the "not yet assigned" field label and type and mask into a GUI accessible to the user for the user to manually tag and assign to a parent content domain or a subdomain. Field labels identical to already assigned and recorded field labels are provisionally assigned to the same parent content domain or subdomain and entries into provisionally assigned fields are categorized as belonging to that parent domain or subdomain; unless these are given multiple domain assignments by the user of the invention.

Indexing or tagging schemata for field labels and enabling alternative assignment of field labels and their associated entries to alternate indexes is intrinsic to the system and method of the invention. An example of how alternate indexing derived from the primary indexing scheme taught below may enable extraction of value or incremental value can be illustrated through shoe size. For a shoe vendor, the shoe size of a set of customers enables inventory management depending on the life or wear cycle of shoes already sold to that set of customers. For a medical researcher, shoe size and wear cycle in combination might indicate a propensity for a potential foot or gait ailment that would benefit from an assignment to podiatry or orthopedic datasets and research to evolve preventative protocols. For the data broker or aggregator, assignment of the field label of "shoe size" to alternate domains or indexes enables resale of data to multiple buyers from multiple verticals, such as shoe manufacturers or wholesalers of shoe laces, and justifies an increase in the offer price or other method of compensation for a dataset from an individual data producer. One embodiment of the invention will implement an algorithm to assign field labels and their associated entries to alternate content domains or indexes based upon the vertical market associated with the field label discovered via keyword searches or by methods and tools responsive to purchase requests from business or marketing operations in a vertical market.

There are at least four primary or parent content domains associated with users that may be assigned or tagged per field label; Connections, History, Search, and Transactions. Multiple schemas for primary content domains and subdomains will evolve for various users and various domains of knowledge, but the four primary content domains serve as exemplars for the implementation of the system and method and for illustrative embodiments. Connections can be subdivided into subclasses, such as social networks, family members, business contacts, co-workers, neighbors, members of a faith community or a political party, and so forth. History can contain subclasses of medical history, occupational history, educational history, test or examination scores, residential locations, credit scores, and so forth. Medical history as an example of the "history domain" can be further classified into traditional medical categories for physician specialties, such as EMT, Cardiology, Podiatry and so forth. These subclasses can also contain subsets such as genetic history, disease and intervention history and so forth. Search can contain subclasses such as commercial (products and goods), ideational (concepts and ideas) with subsets related to news (current) or research (past). Transactions can be classified as Commercial and Non-commercial, and subclasses may be related to purchase history with a subset for "returns for refunds," "purchased on sale," "paid by debit card" and so forth.

Content domains and their associated field labels, types, and masks are commonly stored in memory and posted to a data store linked to an account or dataset associated with the user for repurposing or sale. Real time links to data stores or to API's for further processing are also intrinsic to the invention. An example of the benefit and use of a real time link to an API is reflected in art taught by Smith (U.S. Pat. No. 7,860,760.) It is anticipated that repurposing of data will include, but not be limited to; data for job applications, data to provide to governmental entities as part of registration for services or in compliance with regulations, data to provide to medical providers, data to provide to product vendors, data to provide to researchers, data to provide to data brokers, and so forth. The data may be used to assess compatibility with other persons or entities for matching or qualifying as a competitor or a partner in a game or sport, an employee, a medical research subject, a member of a work team, or other purpose. It may also be used by purchasers of the data for targeting advertising or marketing. It may also be used by medical or pharmaceutical manufacturers for clinical research. Indeed, enriched and ordered datasets as enabled through implementation of the system and method of the invention described herein will facilitate ready extraction of value from the datasets and enable individuals to offer their data and IP in an open and transparent data market as taught by prior art related to the data supply chain.

The user also reviews assigned field labels, types, and masks for assignment to four primary processing classes of fields enabling a server or electronic device to operate upon the data in accordance with the processing class assignment. Multiple schemas for processing classes and subclasses may evolve for various users and various data supply chain operations, but the four primary processing classes serve as exemplars for the implementation of the system and method and for illustrative embodiments. These processing classes are; a class that is "automatically for sale", a class that is to be "retained as private", a class that is "potentially for sale," and a class that is to be subjected to data analytic tools or data mining operations labeled "to be analyzed and assigned." While the descriptive wording of labels associated with said processing classes may change, the distinction between entries associated with fields as being automatically assigned to a class as available for purchase from the data owner, potentially available for purchase by manual decision by the data owner, kept as confidential and not for sale, and to be further analyzed and assigned is expected to be retained in many embodiments of the invention described herein.

The field labels can be further adapted to be the "question" in a data item pair, with the data entered and associated with the field labels being the "answer" portion of a data item pair as in art introduced by Smith (Ser. No. 13/135,420).

Algorithms for parsing and extracting data captured by the data tagger and accumulator and/or key logged data for proper assignment of data field labels and data entries to one or a plurality of domains are intrinsic to the system and method. While the drawings (see FIG. 3) identify 4 primary algorithms, there may be fewer or more algorithms implemented by a given embodiment of the invention described herein. FIG. 4 introduces a dozen exemplars of algorithms involved in various aspects of an embodiment of the invention. To commercialize the invention and provide context for algorithm assignment and for alternative indexing, one or a plurality of preconfigured templates containing field labels and associated domains or indexes tailored to one or a plurality of data brokering or data federation entities may be provided by data collection entities to be downloaded by a user; enabling the user to bypass or to hasten development of their own classification schema. Alternately, the classification schema can be developed by one user and offered or propagated to other users in a social network or offered in a marketplace of classification schemata that have potential value for various users. Examples of such users are homeland security agencies, medical service providers and other providers of services, marketing, sales, or manufacturing entities in specified vertical markets typically labeled in accordance with SIC codes or other standard and widely distributed business classifications. Multiple variants of a single algorithm or multiple algorithms may be developed to enable a user to optionally implement for alternate classification(s) within a dataset if their data is of potential value to multiple vertical markets. One or a plurality of embodiments of the invention described herein, operating in tandem with one or a plurality of embodiments of Smith [(U.S. Pat. No. 8,510,176) which uses search terms to tag potential buyers and sellers of data], enables buyers and sellers of data to connect with one another and will be used by a data producer using the invention to select and shape and order data to meet specifications of potential buyers. Further, a user of a device configured to process computer readable code may be provided an algorithm or set of algorithms to parse an image of a form for field labels and post said field labels for a user to classify and assign manually. Thus, a user can evolve and store a classification schema unique to his own purposes within an algorithm. Further invocations of the algorithm will parse forms and templates for automatic assignment of previously assigned matches with field labels.

Multiple fee schedules may be configured to be charged to a user of a device associated with the system and method of the invention described herein. These include a fee for use of the data tagger and accumulator, a fee for use of a screen capture application or device; a fee for implementation of an OCR (optical character reading) application or device; a fee for algorithm(s) used to extract data; a fee for an algorithm to encrypt a data set; a fee for use of a key logging device or a key logging application; a fee for using a pre-configured template or form for rapid and simplified matching of field labels to content domains and processing classes; a fee for posting or linking datasets to data warehouses or transmitting datasets to data brokers; a fee for converting audio and video files into formats that are "friendly" to the classification process for field labels and data entries, and a fee for the number or counts of data fields posted into forms or templates from dataset(s). Further fees may be configured and charged for formatting data for posting into templates.

A fee schedule may be developed or price may be set to be paid to the user of the invention for a subset of the data by one or a plurality of potential purchasers as part of an offer to purchase or as part of an auction process. A fee schedule or price may also be paid by a consumer or purchaser of the data to the user of the invention according to the completed number of forms or templates. Prices or fee schedules may also be subject to call and response negotiations, such as auctions where the highest bidder may get access to a dataset or be assigned ownership of a dataset. Further, purchasers or consumers of the data may extend offers of coupons, social recognition or rankings, provision of special access to services or functions, provision of special rights of access to other data, and other exchanges of value common to marketplaces for commodities or services. Further, a transaction fee may be charged by the social network hosting the user's data store. A transaction fee may be charged for enabling negotiations between dataset buyers and sellers. A transaction fee may be charged for storing and transmitting the data.

Fees or prices for brokering the data may be collected from one or a plurality of participants in the data supply chain. Fees or prices for facilitating financial transactions may also be collected from one or a plurality of participants in the data supply chain. Further fees or prices may be in the form of incremental improvement in reputation or status within an online community, bitcoin payment and exchange, or other variants used as part of reward and motivation mechanisms in a market economy.

At least one embodiment retains a transactional record of data item pairs and is maintained by the vendor of the data tagger and accumulator or other designated third party and stored for continuous access by the user of the data tagger and accumulator. The user of a data tagger and accumulator may in some embodiments be provided the option to elect to destroy the log associated with their record along with all data associated with their record. A fee may be associated with this service.

The data tagger and accumulator is supplemented by an algorithm to shape data for posting into the dataset upon discovering and confirmation of a match with one or more of the field labels extracted from or stored within templates used by the system and method, this data extracted [as in Smith (20120316993)] from streams of data stored on tags readable by electronic means, streams of data in digital messages, and streams of data from electronic devices; with the proviso that the streams of data are owned by the user of the electronic device implementing the system and method of the invention.

The data tagger and accumulator is further supplemented by an algorithm to shape data for posting into the dataset upon discovering and confirming a match with one or more of the field labels extracted or stored from templates used by the system and method.

An additional algorithm will run in tandem with any one of the algorithms associated with any one of the embodiment of the invention to authenticate that the user transmitting the data to a data purchaser or capturing data through the data tagger and accumulator is the authorized, assigned, or designated user. This algorithm will compare field labels and entries to prior and stored field labels and entries with a sufficient number of concatenations to have a reasonable assurance that the current user responding to a form is the same user who responded to prior field labels. This will enable multiple users to authenticate on a single electronic device configured to process computer readable code and ensure that the data is properly attributed. This authentication algorithm will also prevent users who are not eligible to implement data collection from building a dataset or data store; such as persons who are underage, or who have not been authorized access to one or more of the apparatuses embodied in the invention.

A motivation for a user of the invention to evolve and develop a data store is to implement field label comparisons via an algorithm to identify fields that can be immediately matched with those in the data store and to automate posting entries into those forms, thus saving time and effort of the user who would otherwise be doing redundant manual form completion.

The social benefit of the invention is to enable an individual to control access and distribution of their personal data as they actively exercise their rights to privacy and assert ownership of the intellectual property.

Detailed Explanation of FIGS. 1-4 for Exemplary Embodiments of the Invention

One skilled in the art of the invention will expect that the order and arrangement of the various components of the invention might vary according to some or all of the following variables: access via internet or local access points to forms or templates for data collection; data entry, and data storage; data posting limitations of devices or services, data entry and data storage and posting limitations of internet or other access points into data stores or transmission utilities; user preferences for setup and configuration; the code base used to build and implement computer readable instructions; and whether the invention is implemented by computer readable code on generic devices configured to implement computer readable code or by one or more hard wired apparatuses for a data tagger and accumulator, key logging, scanning, or performing OCR or a combination of hard wired and "software" driven devices. The Figures therefore are only representative of exemplary embodiments and variation is anticipated.

In FIG. 1, titled "Diagram of Event Sequences—Data assignment to Data Transmission for Fair Exchange" illustrates five major functions performed by a user of the invention as enabled by the invention. The first function (F1) is to invoke data tagging and accumulation or alternately to use a key logger which requires the user to (F1a) select a data tagger and accumulator, then (F1b) to authenticate on the selected data tagger and accumulator, then (F1c) to specify a source for a form or template. The template source may be on a local device or server or on accessible through the internet. Upon the user selecting the template source, the user (F1d) connects the device the user is using to the template source (F1e) to open to accept posting into a data source or data store accessible to that device or service. The act of opening the connection also might initiate and enable the (F1f) storing and logging of keystrokes or the data tagger and accumulator. It also might initiate the second function (F2). Not explicitly indicated in the figure is the optional use of a web browser extension for data capture through API calls and electronic field discovery and inspection. If the data tagger and accumulator is implemented, the need for key logging, screen capture, and OCR is reduced and becomes optional in those embodiments. In cases implementing the data tagger and accumulator, the processing may shift directly to the fourth function (F4).

The second function (F2) is for the user to invoke a screen capture. Screen capture may precede of follow invocation of a key logging function. The user then (F2a) selects a screen capture tool or scanning device, stores (F2b) the captured or scanned image of a webpage or template that is able locally or remotely to accept data input from the user, and opens the captured or scanned image to accept (F2c) initiation of an OCR process upon the captured or scanned image.

The third function (F3) for connecting or linking to templates is by (F3a) to access and authenticate on a website or local device to capture the template image for OCR processing so the form or template can be posted upon a local device to accept user posts of entries or accept user responses directly into the form or template. The (F3b) user then optionally implements an OCR program. The OCR implementation may be (F3b1) by user invocation or begin automatically, resulting in (F3b2) a posting of the OCR data into a processing algorithm that formats and captures field labels.

The fourth function (F4) is the implementation and actions of one or more of the algorithms. Beginning with (F4a) the device accepts input from the user or automatically initiates or (F4b) implements the algorithm—including the algorithm variant to parse video and audio data streams, (F4c) posts the algorithm results to a data store in memory or to online storage, and retains (F4d) or stores a log of user input. Because an algorithm also can implement pricing or calculate and set a price or value for particular field labels and entries associated with them, the user may instruct the algorithm to accept (F4e) a manual override of an automatically calculated exchange value or price.

The process for field label assignment of (F4b) is illustrated through (F4b1) the user invoking field assignment by (F4b1i) selecting one or more field collation algorithms; then (4b1ii) initiating a collation process that also includes (F4b1iia) tagging field labels, (4b1iib) tagging field types, and (F4b1iic) tagging field masks. Tagging is followed by (F4b1iii) posting collated fields for assignment to processing classes; such as (F4b1iiia) which tags a fields along with their entries as available for purchase or (F4b1iiib); or as confidential and not for sale, (F4b1iiic) or as subject to a user decision or choice; and (F4b1iiid) also designates fields for further analysis by the user or as the algorithm "learns" to better assign tags to other categories.

In tandem with, or following tagging of field labels, the algorithm will further (F4b1iv) post collated fields for user assignment or tagging to content domains. These domains may vary considerably and are editable and adjustable within the algorithm by a user through or wizard or other interface, though it is expected that one tag will be commonly be for (F4b1iva) connections or network members. A second domain will be for (F4b1ivb) data reflective of the history of the user, such as the user's education, or work history. A third domain will be for (F4b1ivc) search records. A fourth domain (F4b1ivd) will be for transactions. Further actions by the algorithm are; (F4b1v) to store collated match results in device memory or a data store and (F4b1vi); to build a link to a pricing schema or a pricing and calculation tool for trading the data as in (F5).

The fifth function (F5) implements the pricing schema and performs the calculations to compute prices or exchanges and enables links to purchasers. Beginning with (F5a), an instruction is implemented to calculate the result of the pricing formula of fields coupled with entries; then an instruction is implemented (F5b) to calculate the value resulting from the pricing formula; then an instruction is implemented (F5c) to post the value resulting from the calculation of the formula; and finally an instruction is implemented (F5d) to store the value resulting from the calculation of the formula. At this point, the algorithm enables (F5e) transmission from the user to the dataset of an authorized purchaser; or provides an access to the data store for the authorized purchaser, and (F5f) stores a record of transmissions of and/or accesses to the dataset.

FIG. 2 details field assignment and algorithm operation through illustrating (F2A) user actions and (F2B) server or device events. Note that the figure illustrates through arrows that user actions and server or device actions occur in tandem and may be originated by the user actively instructing the device; or by the device or server operating automatically according to the variant of an embodiment of the invention.

The user initially (F2A1) loads a template or form into a GUI of a device; then (F2A2) invokes scanning or screen capture of the form or template or alternately the use of the data tagger and accumulator to invoke a web extension to perform data capture API calls and electronic field discovery and inspection; then, if needed, (F2A3) invokes an OCR function or program or apparatus to assign fields for processing by an algorithm that will associate discovered field labels with prior field labels; or will perform comparisons and estimations of likelihood and other artificial intelligence or statistical methods to determine and link field labels according to the likelihood of a correlation.

The user also constructs content parameters (F2A3.1) for domain assignment for (F2A3.1a) transactions, (F2A3.1b) history, (F2A3.1c) connections, and (F2A3.1d) search. The user then establishes parameters (F2A3.2) for processing parameters for a field label, such as (F2A3.2a) private or not for sale, (F2A3.2b) for sale at a fixed price (F2A3.2c) potentially for sale upon negotiation or a pricing agreement, and (F2A3.2d) for assignment to user decision or further processing. The user may also (F2A3.3) assign prices or values based upon returned matches of fields within a stored log or historical table of prices or values. Beginning with (F2A3.4) the user sets up the path for the algorithm to execute through an algorithm by (F2A3.4a) accepting parameters for assignment of field labels, (F2A3.4b) posting parameters for assignment of field labels, (F2A3.4c) storing parameters for assignment of field labels, and (F2A3.4d) storing a record or table of the most recent assignments of field labels. In (F2A3.5) the user reviews and confirms these field label assignments and pricing such as (F2A3.5a) to confirm provisional assignments displayed via the algorithm; (F2A3.5b) to accept user confirmation or enable manual reassignment of domains and processing parameters and prices; and finally, (F2A3.5c) to confirm prices and implement exchanges. As the parameters are established, the user (F2A4) invokes a data tagger and accumulator or initiates key logging by a device or apparatus or through computer readable code; then (F2A5) invokes an algorithm to match fields with entries; then (F2A6) invokes encryption or database locks or other security measures; and finally, (F2A7) accepts an offer to purchase a dataset or posts an offer of a dataset for sale and selectively unlocks the tables or datasets to display portions of tables or the dataset to prospective purchasers.

On the local server or device side represented by tag labels under B in FIG. 2B are illustrations of local server or device events or actions to (F2B1) enable a user to access and authenticate on a local server or device, to (F2B2) execute image capture and (F2B3) execute OCR. As the device (F2B4) accepts user input into a GUI or form or template, the device also (F2B4a) executes key logging and (F2B4b) executes computer readable instructions to configure data tables. The device or local server (F2B5) observes and tags field label matches and collates user entries by (F2B5a) building one or more data item pairs or alternately (F2B5b) building a dataset through accumulation and iteration.

The local server or device then (F2B6) implements encryption, database locks, vaulting and other data protection options. This is followed by (F2B7) which executes links to potential purchasing entities and places samples of the available data into the GUI of the local server or device. The local server or device may further (F2B7.1) invoke a VPN connection or an (F2B7.2) asynchronous key routine to authenticate a purchaser, or (F2B7.3) set up some other mechanism for linking to a potential buyer. Finally, the local server or device (F2B8) observes whether an acceptance of terms has been indicated and executes one or a plurality of financial transactions as it (F2B9) logs, generates and posts a record of transactions.

FIG. 3 is a diagram illustrating processing and pricing, and provides examples of how algorithms can be folded into the invention. The user, through a server (F33.1), accesses a data entry screen or form and (F33.1a) posted to a website via a server that (F33.1b) is configured to accept a device to device connection for posting forms from a form source; and then (F33.1c) accepts a form template from a form source (such as a data broker) or (F33.1d) connects to a cloud service that has posted the form via the cloud service. A screen capture of the data entry screen (F33.2) is initiated and (F33.2a) an image of the form is posted into the GUI of the server or data is captured through the data tagger and accumulator performing API calls and electronic field discovery and inspection. If a data tagger and accumulator is invoked, a web extension and API calls are used, then the screen capture and the OCR and key logging are no longer essential steps—but in some embodiments may be used as a double check or backfill or confirmation of the field labels and entries tagged through the web extension and API call. A (F33.2b) screen capture process is executed with (F33.2c) the captured screen posted into a memory cache or data store. Next, (F33.2d) the stored image(s) of other forms are compared against the present image of a form to reduce redundant processing. If the form image is already in the data store the data captured is tied back to that image. Next, (F33.2e) the image is posted into the GUI for the user to view and to (F33.3) execute OCR and further process field labels. When a user (F33.3a) views a form, the user determines whether to execute OCR. If the user (F33.3b) initiates OCR and invokes the algorithm (F33.3c), (such as "algorithm 1") the algorithm will begin to operate upon field labels.

A pivotal operation by the algorithm is to (F33.3c1) tag field labels, then (F33.3c2) compare the field labels against stored or previously accumulated field labels, then (F33.3c3) assign newly identified field labels to a domain. (F33.3c4) New field labels may be highlighted or otherwise indicated within GUI for the user to confirm or override in regard to domain assignment. (F33.3c5) The user may also assign a processing class or have an artificial intelligence algorithm classify domain assignments or processing classes, which the user may override at the user's discretion.

The user or an algorithm enabled to implement computer readable code to drive an electronic device may (F33.4) initiate a data tagger and accumulator (F33.4a) or a key logger; and, as a user initiates key logging or as automated key logging begins, the user (F33.4b) enters responses into empty fields as the (F33.4c) data tagger and accumulator records entries and posts these to data store. A (F33.4d) second algorithm "algorithm 2" or a second part of the first algorithm may also encrypt and otherwise processes entries prior to posting these to data store. A third algorithm (F33.5) "algorithm 3" or continuation of the processing capability of the first or second algorithm then pairs field labels with entries and formats them for posting into data tables. Thus the set of data field labels (F33.6) is shaped into structured set of data field labels collated with a record of each of the entries associated with the data field label, and these are stored and formatted for sale. A fourth algorithm (F33.7) "algorithm 4," or the user, or a continuation of another algorithm included into the invention further shapes and allocates data and tags it as "saleable."

Many options are available to the user of the invention if the user determines a need to set and enable pricing (F33.8) pricing for the transactions and the data. Indeed monetization of data as a commodity to be traded in an open market by individuals as well as larger entities is a focus of the invention described herein. Fees may be charged for a variety of activities such as (F33.8a) participation in an auction process, (F33.8b) completion of a number of forms or templates, (F33.8c) participation in call and response negotiations or negotiated purchase prices. Fees may also be substituted with (F33.8d) offers of coupons, social recognitions, special access to services or functions, special rights of access to other data, or other exchanges of value that may be offered by a buyer.

A (F33.8e) transaction fee may also be paid to a user or collected from user by a social network for hosting a user's data store. In the case of a payment by the social network, the data would be "saleable" by the social network following payment. In the case of the user paying the social network, it would be for the user to expose their dataset to a broader market associated with the social network. (F33.8f) Transaction fees for enabling negotiations between dataset buyers and sellers may also be charged by data brokers or others who aggregate and federate data. (F33.8g) Fees for storing and transmitting the data may also be part of the monetization of a data supply chain as are (F33.8h) fees for brokering the data, (F33.8i) fees for facilitating financial transactions, and fees for automated posting of data into forms.

Another method to monetize the use of invention within the data supply chain is to (F33.9) charge for use of the method or portions of the method of the invention itself. A fee (F33.9a) may be charged for use of a screen capture application or device or a data tagger and accumulator, a fee may be charged (F33.9b) for implementation of an OCR process or reader, a fee may be charged (F33.9c) for algorithms or subroutines used to extract data, a fee may be charged for use of (F33.9d) an algorithm to encrypt a data set, a fee may be charged (F33.9e) for use of a key logging device or a key logging application, a fee may be charged for (F33.9f) using a preconfigured template or form for rapid and simplified matching of field labels to content domains and processing classes, a fee may be charged for (F33.9g) for posting or linking datasets to data warehouses or transmitting datasets to data brokers, a fee may be charged for (F33.9h) the number or counts of data fields posted into forms or templates from dataset(s), and a fee may be charged for (F33.9i) formatting data for posting into templates. Combinations of these fees in various permutations can all be charged to a user of the invention. All of the fee options fold into a step in the trading process that leads to (F33.10), the posting and trading of the data itself.

FIG. 4 is a diagram of processing options or steps involved in implementing the invention. With (F44.1) an entity is accessed by a user through an electronic device and (F44.1a) the user registers and authenticates on the device; then (F44.1b) the user is presented with registration or enrollment forms. These can be accessed through (F44.1b1) websites (F44.1b2) social networks, (F44.1b3) stores or businesses, (F44.1b4) at government agency registration sites or desks or kiosks, or (F44.1b5) through other access points provided by data consumers for users to enter responses into forms or templates.

A variety of character input sources or input tools are available to a user (F44.2), such as (F44.2a) virtual keyboards on tablets and smartphones, (F44.2b) scratch pads like the old palm pilots, (F44.2c) computer mice, (F44.2d) pen pads, (F44.2e) barcodes, (F44.2f) QR codes, (F44.2g) magnetic strip readers, (F44.2h) and captured audio and video data streams generated by the user of the invention associated with the user of the invention. (F44.2h) "Other" methods include alphanumeric characters or media or data that can be converted into alphanumeric characters that can be automated by electronic devices or embedded into images processed by electronic devices. Those skilled in the art will recognize that input is dependent on the device, the available technology to connect the user to a device, and the tools and methods enabling conversion of electronic information into alphanumeric text strings.

With (F44.3), the user or algorithms pre-configured and linked into the invention automate or enable manual implementation of native desktop/windowing API methods to identify and assign fields and their contents such as (F44.3a) proximity detection, (F44.3b) tab-order indication, (F44.3) web browser auto-fill features, (F44.3d) alt-key shortcuts, and (F44.3e) other tools and methods. (F44.3A) illustrates that data capture through API calls and electronic field discovery and inspection through the data tagger and accumulator is available in some embodiments of the invention. (F44.3B) illustrates the capture of data via a data tagger and accumulator.

An additional function or process performed by a user of the invention or by algorithms associated with or included with the invention is (F44.4) data protection. These can be (F44.4a) a VPN or other means for protected transmission; and/or (F44.4b) encryption following OCR of forms to capture field labels; and/or (F44.4c) encryption as entered into form or template; and/or (F44.4d) key substitution routines; and/or (F44.4e) erasing the data from the originating device and transmitting or posting into a removable storage device; and/or (F44.4f) other functions or process to protect the data. All these functions and processes can be enabled and configurable within an embodiment of the invention described herein.

Embodiments of the invention will commonly implement computer readable code to connect devices of users of the invention and offer access to data entry forms that can accept input into the form from a user who is accumulating and posting entries to a data store. If data capture through a data tagger and accumulator performing API calls and electronic field discovery and inspection is not implemented in a given embodiment, a user will instruct the device to initiate the capture of an image of a form, and the optical character recognition process can be initiated to identify field labels and data entry field masks types and ranges. These are compared through an algorithm with field labels and associated data entry field masks types and ranges already in the data store. If a field label along with its data entry masks types and ranges is not already in the data store, the newly discovered field label is appended to the field label list along with its data entry masks types and ranges.

Matched field labels and entries are posted into a section of the GUI of the user's device. In some embodiments the user will confirm or be given an option to make an assignment of the field labels and entries to content domains, processing classes, and to set prices or fees for use of the data. For unmatched or new field labels and entries, a second section of the device's GUI will be posted to accept assignment of the field labels and entries to content domains, processing classes, and to set prices or fees for use of the data.

Various embodiments may provide alternatives to strict fees or prices and enable consideration for the trade in other ways. Examples are coupons, website or data access privileges or increases in status or rank or reputation score within a social network, or other of the plethora of exchanges agreed to by the recipient or buyer of the data and the sender or seller of the data. These are "considerations" for data exchange and assignments to content domains and processing domains are recorded within the data store and descriptions of the contents and made available via many of the methods for announcing or offering material of value within a marketplace.

Methods for announcing or offering material of value within a marketplace as are provided by EBay and Amazon can be further enabled in embodiments of the invention. This a third party may be enabled to list field labels and prices for field entries to other entities that might be interested in a purchase, a trade, or other exchange. If a potential buyer indicates an interest through an electronic notification process or message, the user of the invention accepts or rejects the price or trade or exchange value from said the potential buyer (second user); sends a notification to the buyer if the user agrees to sell and effects the sale or trade by transmitting the agreed upon entry fields and data entries from the user's data store. If the buyer is a data federator or aggregator, the same process occurs. Sales or trades can occur directly through standard methods used by e-commerce vendors. In some embodiments, a third party facilitates the transaction.

An embodiment of the invention for use in research enables screen images to be included into a catalog of data collection and other form images for conversion by the OCR reader into a set of field labels. This feature of the invention can be leveraged by a data collector or researcher to bypass the current tedious processes for building surveys within specialized survey software packages, because the researcher can simply post or offer access to any data collection form via any image sharing or transmission vehicle. A user of the invention processes the images through the user's local device OCR capability and appends the field labels to the user's local data store of field labels. The user has the advantage of being able to retain entries made in response to the research collection forms and to subject them to the user's unique classification schema of content domains and processing classes.

A schedule for transmission of a dataset of field labels and their entries can be part of an agreement for data trading, as can an agreement to send an updated dataset of field labels to a prospective or current purchaser (data consumer) and if these entries change or if a subset of these change. The electronic device of the user transmits a record of agreements for price or trade or exchange value between the user and one or a plurality of users to a third party for the third party to manage one or a plurality of financial functions involving data trading, including scheduling data transmission payments trades and exchanges. Embodiments can enable modification to methods for payment of fees or other trading and exchange agreements by either party to a data transfer or sale. Continuous or intermittent polling across devices by one of the parties to an exchange or trade can be enabled in some embodiments, thus the user of the invention can be alerted to changes in market value and data buyer behavior or expectations. This may, in some embodiments, require a user to allow authentication or access by a second user or a third party to the electronic device of the user housing the data store.

For any of the functions that implement the invention, hard wired apparatuses can be invoked by a user of the invention such as scanners, optical character or RFID or QRcode readers, or data taggers and accumulators. Variants of the data tagger and accumulator are a special case for embodiments of the invention. The definition of a data tagger and accumulator is either a browser extension or operating system service that inspects an active form and collects the data before it is submitted, or a key logger character stream, or a screenshot that has been subjected to OCR. Embodiments will vary according to the way the "internet of things" and the technology for pervasive computing evolves. The invention is readily configurable.

With the evolution of shared research across many users and entities like Wikipedia and other open data accumulation and structuring entities, it is expected that social networks, data sharing consortia in vertical or horizontal markets, and a variety of data aggregators and federators will emerge, and the user of the invention will have the option to designate any entity as a data sharing partner on a fee basis or for exchange for social benefit without consideration or fee. Further, there are already multiple initiatives to use artificial intelligence to classify and store data traversing the Internet and the user of this invention may opt to participate in automated content domain classification schemata and automated assignment to data processing classes. The user may also opt to participate in automated data pricing and fee setting consortia as the data trading economy or data supply chain evolves. The invention can be configured to operate in background upon an electronic device of the user and invoked to post into a GUI only when the user wants to manually change the configuration of one or a plurality of features or processes involved in the method of the invention.

Included in the configuration of one or more embodiments of the invention is linkage of users via protected transmission vehicles and methods, such as a virtual private networks, data encryption; key substitution, posting to secure or removable data store devices or facilities; and periodic erasure of data or automated or conditional erasure of data.

The invention introduces efficiency into the process for responding to a form to collect data because the match algorithm inserts data into a form. The significant difference with current automated form completion processes is that the form completion enabled though the invention described herein enables the user of the invention to retain control over the data unless the user consciously determines there is mutual benefit to allowing a third party access to the entries responsive to field labels and entered to complete the form.

Those skilled in the art will understand that the invention disclosed herein can readily be applied to any structured data collection and that the resulting ease of entry, self-directed data exchange, and compensation for data that has value will significantly advance the evolution of a broad, rich, diverse, and immediately useable data supply chain.

The invention claimed is:

1. A method comprising:
authenticating an electronic device of a first user to connect to an electronic device of a second user to operate upon one or a plurality of forms posted upon said device of said second user;
capturing upon said device of said first user one or a plurality of images of said one or a plurality of forms posted upon said device of said second user;
loading into memory upon said device of said first user a data store of field labels with associated data entry field masks, types, and ranges;
recognizing within said one or a plurality of images field labels with associated data entry field masks, types, and ranges contained within said data store;
matching said recognized field labels with associated data entry field masks, types, and ranges contained within said data store, wherein for the condition where one or more field labels are unmatched said method comprises:
appending unmatched field labels with associated data entry field masks, types and ranges to said data store;
assigning said unmatched field labels by said first user to one or a plurality of content domains, one or a plurality of processing classes, one or a plurality of indexes, and one or a plurality of sale or trade values; and
collecting from said first user field entries responsive to said unmatched field labels;
posting and saving a record of said collected field entries matched to said field labels to said data store;
composing a notification by said first user to at least one of one or a plurality of users listing one or a plurality of content domains containing the one or plurality of field labels as being for sale or trade;
posting a sale price or trade value for said one or a plurality of content domains containing one or a plurality of field labels into said notification;
posting one or a plurality of options for updating said field entries coupled with said field labels into said notification;
observing by said device of said first user if at least one or a plurality of users is positively responsive to said notification;
accepting by said device of said first user an indication of acceptance by said at least one or plurality of users of said price or trade value for said field labels coupled with said field entries;
transmitting confirmation of an agreement by said first user to sell or trade said one or a plurality of field labels coupled with said field entries to said at least one or a plurality of users;
transmitting said one or a plurality of field labels coupled with said field entries from said data store of said first device to a device of said at least one or a plurality of users who are positively responsive to said notification;
configuring by said first user a schedule for transmission to a device of at least one of said one or plurality of users said one or a plurality of field labels coupled with said field entries upon a change to said one or a plurality of field entries;
implementing by said device of said first user transmission to a device of said at least one or a plurality of users of said one or a plurality of field labels coupled with said field entries upon a change in one or a plurality of said field entries;
posting said field entries coupled with said field labels from said data store into said one or a plurality of forms on said device of said at least one or a plurality of users upon a change to one or a plurality of entries; and
executing the terms and conditions of said agreement.

2. The method of claim 1, wherein said capture of images is achieved through invocation of a scanning apparatus.

3. The method of claim 1, wherein said capture of images is achieved through invocation of optical character recognition of said field labels achieved through an optical character reading program.

4. The method of claim 1, wherein field labels and field entries are accumulated using at least one of the following comprising:
a browser extension or operating system service that inspects an active form and collects characters from a character input device to operate as a data tagger and accumulator before said characters are submitted;
a character stream captured by a key logger as keys are entered upon the device of said first user; and
a screen image captured on the device of said first user with said screen image then being subjected to optical character recognition to extract field labels and field entries coupled with said field labels.

5. The method of claim 1, wherein the electronic device of said first user transmits a right of access to said electronic device and to data stored in said data store to said device of said one or a plurality of users to manage one or a plurality of data transfer functions involving data trading.

6. The method of claim 1, wherein the electronic device of said first user transmits a record of agreements for said sale or trade between said first user and said one or a plurality of users for said one or a plurality of users to manage one or a plurality of financial functions involving data trading.

7. The method of claim 1, wherein said first user designates said one or a plurality of users as a recipient of said data fields and assigned field entries wherein said one or a plurality of users is at least one of one or a plurality of social network users, one or a plurality of data federator entities, one or a plurality of data aggregators, one or a plurality of institutions, one or a plurality of business entities, or one or a plurality of governmental agencies.

8. The method of claim 1, wherein an artificial intelligence algorithm and computer program upon said electronic device of said first user automates optical recognition upon said forms upon said second device of said second user and posts said field entries upon confirmation of a match with said field labels drawn from said data store of said first device.

9. The method of claim 1, wherein said device of said first user is configured to operate in background unless said first user instructs said electronic device of said first user to load a configuration profile to accept changes to one or a plurality of instructions for said capture of images of forms, for said optical recognition of field labels, for said capture of field entries, for setting of said sale or trade value for said one or a plurality of field labels coupled with field entries, for scheduling and transmission of said one or a plurality of field labels coupled with said field entries, and for executing terms and conditions of said agreement for sale or trade between said first user and said one or a plurality of users.

10. The method of claim 1, wherein said electronic devices use as least one of one or a plurality of a keyboard, virtual keyboard on a tablet, smartphone, scratch pad, and a computer mouse.

11. The method of claim 1, wherein said electronic devices use as least one of one or a plurality of a character input vehicles including one or a plurality of pen pads, barcodes, QR codes, or magnetic strip readers.

12. The method of claim 1, wherein said field entries are matched with said field labels using native desktop and windowing API methods to identify said field labels including electronically enabled proximity detection, tab-order indication, alt-key shortcuts, and web-browser auto-fill features.

13. The method of claim 1, wherein said data derived from said data store is transmitted using protected transmission vehicles and methods to retain privacy of said data, said methods including:
   use of a virtual private network for transmission of said data;
   encryption of said data prior to transmission;
   implementation of a key substitution routine to encrypt said data as said data is entered;
   port said data onto one or a plurality of removable drives; and
   erasure of said data from the device of the first user upon transmission of said data to a storage device.

14. The method of claim 1, wherein said first user invokes computer readable code on the device of said first user to automatically post said field entries that match one or a plurality of said field labels housed in the data store of said electronic device of said first user into a form posted onto a device of said second user.

15. The method of claim 1, wherein said first user invokes computer readable code to run on the electronic device of said first user for said first user to manually tag and assign a field label to:
   one or a plurality of said content domains;
   one or a plurality of said processing classes; and
   one or a plurality of alternate indexes.

16. The method of claim 15, wherein said content domains can include parent content domains and subdomains for connections, history, search, and transactions; and said processing classes can include automatically for sale, retained as private, potentially for sale, and to be analyzed and assigned.

\* \* \* \* \*